Sept. 5, 1967 G. BURKHARDT ET AL 3,339,705
ARTICLE CONVEYING

Filed Dec. 28, 1965 4 Sheets-Sheet 1

INVENTORS
Gisbert Burkhardt &
Hans Rapparlie

BY Spencer & Kaye
ATTORNEYS

Sept. 5, 1967 G. BURKHARDT ETAL 3,339,705
ARTICLE CONVEYING
Filed Dec. 28, 1965 4 Sheets-Sheet 2

INVENTORS
Gisbert Burkhardt &
Hans Rapparlie
BY Spencer & Kaye
ATTORNEYS

Sept. 5, 1967   G. BURKHARDT ETAL   3,339,705
ARTICLE CONVEYING

Filed Dec. 28, 1965   4 Sheets-Sheet 3

INVENTORS
Gisbert Burkhardt &
Hans Rapparlie

BY Spencer & Kaye
ATTORNEYS

Sept. 5, 1967  G. BURKHARDT ET AL  3,339,705
ARTICLE CONVEYING
Filed Dec. 28, 1965  4 Sheets-Sheet 4
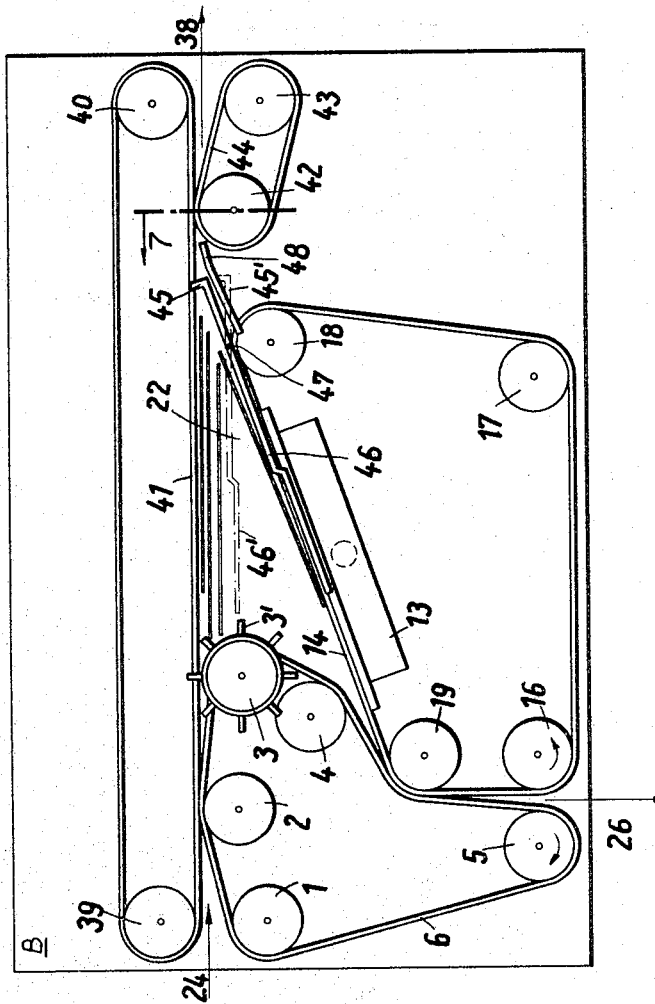
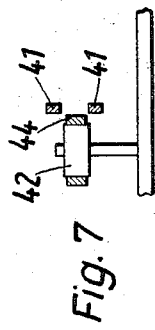
INVENTORS
Gisbert Burkhardt &
Hans Rapparlie
BY Spencer & Kaye
ATTORNEYS United States Patent Office 3,339,705
Patented Sept. 5, 1967

3,339,705
ARTICLE CONVEYING
Gisbert Burkhardt and Hans Rapparlie, Constance, Germany, assignors to Telefunken Patentverwertungsgesellschaft m.b.H., Ulm (Danube), Germany
Filed Dec. 28, 1965, Ser. No. 516,909
Claims priority, application Germany, Dec. 28, 1964, T 27,718
10 Claims. (Cl. 198—34)

The present invention relates to the field of conveying, and particularly to the creation of a uniform flow rate of items supplied at an irregular rate.

Devices of this type, known as flow separators, are already known and have proven to operate reasonably well. However, these items possess several drawbacks particularly with regard to their reliability and to their range of uses. In particular, when items of mail are supplied to these devices with an unfavorable degree of overlapping, certain problems arise. One such device is described in U.S. patent application Ser. No. 481,296, filed on Aug. 20, 1965, and having the same assignee as the present application. Although this device is capable of producing an output flow having a uniform direction of overlapping when supplied with items of mail which are fed in at a random rate and with some degree of bunching, it is not capable of creating a complete separation between the items flowing out therefrom.

It is an object of the present invention to overcome the above-mentioned drawbacks.

It is a more specific object of the present invention to produce a uniform outflow of items which have been supplied at any irregular rate and with any type of overlapping.

It is another object of the present invention to give any irregular arrangement of items a uniform flow rate in a relatively simple manner.

Still another object of the present invention is to produce a uniform flow rate in a relatively simple and inexpensive device.

According to the present invention, the procedure for converting an irregular flow of flat items into a flow having a uniform density and a regular arrangement is carried out by conveying the irregular flow in a first direction through a conveyor device, then halting the items against an intercepting member, and bringing that end of each successive item which was trailing during its conveyance through the conveyor device within the zone of influence of a suction conveyor section. According to this procedure, each item is then accelerated in succession along the suction conveyor section in a second direction which forms an angle of between approximately 120° and 180° with the direction of flow through the conveyor device.

A device for carrying out a somewhat similar type of operation has already been described in the German patent specification No. 1,146,439. The device described therein, however, is intended to perform an entirely different function since it merely reverses the direction of movement of flat rectangular articles in order to bring these items into the required positon for reading. These items are separated in a preceding device such as an intermediate stacker, for example, and only then are those items which must have their position reversed supplied to the device. The concept that such a device could be used not only for reversing the direction of conveyance of previously separated items, but also to produce a conveying flow of separated or uniformly overlapped items, in which case the reversal of the direction of their conveyance is of no great importance, is both novel and surprising.

The present invention thus also relates to the device for carrying out this novel operation. This device essentially includes a feed conveyor section for conveying the random flow of items in a first direction, an intercepting member positioned for halting the items after they have left the feed conveyor section, and an accelerating section disposed adjacent the intercepting member. The accelerating section preferably includes a suction conveyor belt for carrying off each item in succession when that end of the item which was trailing during its passage through the feed section comes into the zone of influence of the suction belt. Moreover, this belt is oriented to move the items in a second direction which forms an angle of approximately 120° to 180° with the above-mentioned first direction. The arrangement of elements is such that the intercepting member and the accelerating section define between them a buffer storage area in which the items are temporarily stacked during intervals when their rate of flow through the feed conveyor section is greater than the rate at which they are carried off by the suction conveyor belt.

Additional objects and advantages of the present invention will become apparent upon consideration of the following description when taken in conjunction with the accompanying drawings in which:

FIGURE 4 is a plan view of a further embodiment of the present invention.

FIGURE 7 is a detailed view taken along the plane defined by line 7 of FIGURE 4.

Figure 1:
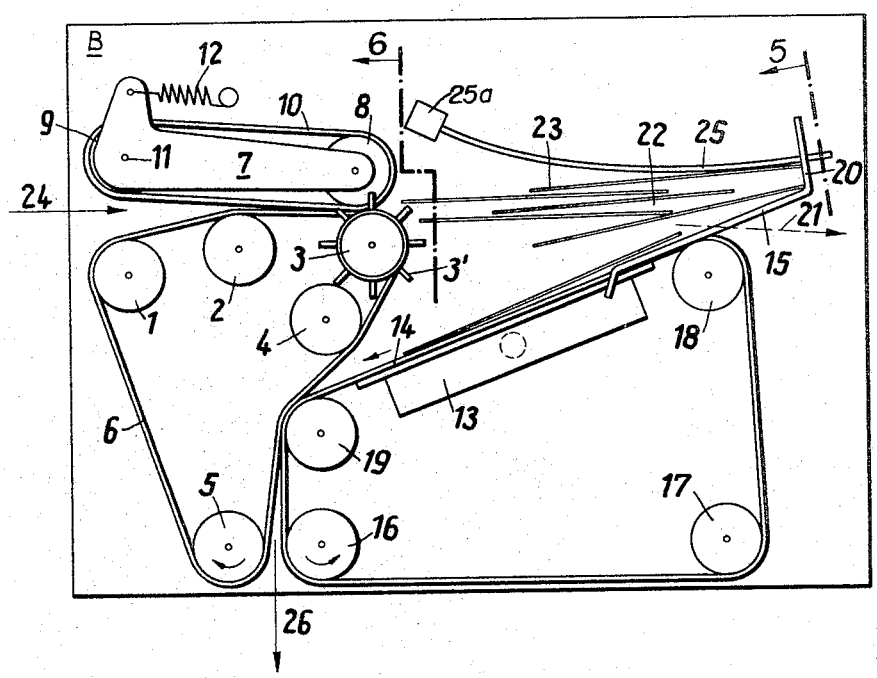
FIGURE 1 is a plan view of a first embodiment of the present invention.

The device illustrated in FIGURE 1 includes a feed conveyor section having a conveyor belt 6 guided over rollers 1, 2, 3, 4 and 5, all of which are pivotably mounted on a support base B for the device, and a conveyor belt 10 guided over rollers 8 and 9. Roller 9 is pivotably mounted on the support base B for the device by means of a pivot pin 11, while roller 8 is pivotably mounted on the free end of the long arm of a rocker 7 which is also pivotably mounted on pivot pin 11. The free end of the other arm of rocker 7 is connected to a tension spring 12 whose action on rocker 7 is such as to urge conveyor belt 10 against conveyor belt 6. The arrangement of belts 6 and 10 is such that these belts form, in the region of rollers 1 and 9, an input hopper for receiving items, such as envelopes, to be conveyed by belts 6 and 10 in the direction of the arrow 24. The device also includes an accelerating section formed by a suction conveyor belt 14 passing over a suction trough 13 which communicates, in a conventional manner, with a suitable low pressure, or vacuum, source. The accelerating section also includes an approach wall 15 which is arranged to form an extension of belt 14. The suction conveyor belt 14 is guided around rollers 16, 17, 18 and 19 all of which are pivotably mounted on the support base B for the device. Belt 14 forms, together with belt 6, an exit for items from the device in the region between rollers 5 and 16.

If the items to be conveyed are to leave the device with a certain amount of overlapping, the suction conveyor belt 14 is uniformly perforated along its entire length in a conventional manner. If, on the other hand, the items to be conveyed are to be completely separated from one another, the suction conveyor belt will be provided with groups of holes distributed along its length at appropriate distances from one another, also in a conventional manner.

The device further includes an intercepting member constituted by a simple intercepting wall 20 disposed at the rear end of approach wall 15 for intercepting the items introduced between belts 6 and 10.

In the embodiment of FIGURE 1, the direction of travel of items on suction conveyor belt 14 forms an angle of about 155° with the direction, indicated by arrow 21, in which these items are conveyed by belts 6 and 10. The feed conveyor section, the intercepting member and the accelerating section are arranged with respect to one another in such a manner that the incoming items introduced between belts 6 and 10 come up against approach wall 15 or intercepting member 20 and then come under the action of suction conveyor belt 14, in the order in which they pass between belts 6 and 10, with their previously trailing edge foremost. When the items 23 are introduced into the device at a higher rate than that at which they are carried off by suction conveyor belt 14, the region 22 acts as a buffer storage area for temporarily stacking the items until they can be successively carried off by belt 14. As may be seen from FIGURE 1, this buffer storage area 22 is disposed between the intercepting member and the accelerating section.

The device of FIGURE 1 is arranged so that the distance between the outlet end of the feed conveyor section defined by belts 6 and 10 and the intercepting wall 20 is greater than the length of the longest item 23 to be handled by the device.

When the items 23 are introduced into the buffer storage area 22 by the feed conveyor section, they follow a path which intercepts the elements 14 and 15 of the accelerating section at a point ahead of the intercepting member 20, this path being indicated by the broken-line arrow 21. As the trailing edge of each item leaves the region between belts 6 and 10, this trailing edge is impelled toward the suction trough 13 before the item reaches one of the walls 15 and 20 by resilient impellers 3' extending radially from the roller 3 at each side thereof. The arrangement of impellers 3' can be best understood by considering FIGURES 1 and 6 together. The action of impellers 3' serves to ensure that the trailing edge of each item 23 will come within the zone of influence of the suction conveyor belt 14.

In the device of FIGURE 1, the lateral mobility of the items 23 is increased by constructing the feed conveyor section, or by forming the buffer storage area 22, in such a manner that the lower edge of each item 23 will be disposed slightly above, by a few millimeters, for example, the horizontal support surface of base B within the region 22 when the item leaves the feed conveyor section.

Figure 5:
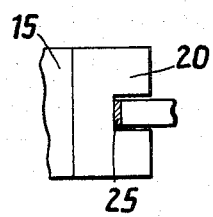
FIGURE 5 is a detailed view taken along the plane defined by the line 5 of FIGURE 1.

According to another advantageous feature of the arrangement of FIGURE 1, yieldable means are provided along one side of the buffer storage unit 22 for urging the stacked-up items toward the accelerating section 14, 15. The flexible means are constituted, in the device of FIGURE 1, by a resilient urging member 25 which is rigidly connected to the support base B for the device by means of the holding member 25a and which has its other end resiliently engaged in a notch in the intercepting wall 20, as may best be seen in FIGURE 5.

Figure 6:
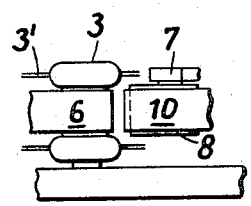
FIGURE 6 is a detailed view taken along the plane defined by the line 6 of FIGURE 1.

In accordance with a technique which is already known in the field of stacking devices, the feed conveyor section is constructed in such a manner as to give the items passing therethrough a curvature which is perpendicular to their direction of travel. This curvature effectively stiffens each item and thus assures its proper delivering into the stacking area 22. In the embodiment of FIGURE 1 this curvature is imparted to each item 23 by forming the roller 3 so that its two end regions have a larger diameter than the interior region over which belt 6 passes, the belt 10 passing over roller 8 being disposed between these two end regions. This is best seen in FIGURE 6. It may be readily appreciated that this arrangement advantageously gives each item 23 a curvature which is convex in a direction toward the accelerating section 14, 15.

In operation, items 23 can be introduced into the device in the direction of the arrow 24 at any irregular rate, i.e., they may be bunched up or introduced separately, and they may be overlapped in any manner. They pass between the conveyor belt 6 and the conveyor belt 10, with the pivotable mounting of rocker 7 permitting the conveyor belt 10 to yield resiliently outwardly by any required amount. In the region between rollers 3 and 8, the items are given a stiffening curvature, as mentioned above, which increases the certainty that they will be impelled into stacking area 22 and toward the intercepting wall 20 as they leave the feed conveyor section. In the case where a bunch of items 23 reaches the stacking area 22 almost simultaneously, as is illustrated in FIGURE 1, a brief temporary stacking of the items occurs. Owing to the arrangement of the device of FIGURE 1, each of the group of items 23 will successively come under the influence of the suction conveyor belt 14. It may be appreciated that the edge of each item 23 which was trailing during its passage through the feed conveyor section becomes the leading edge during its travel along the conveyor belt 14 of the accelerating section. The group of items are thus withdrawn at a uniform rate and in sequence by the conveyor belt 14 and are delivered in this order between the rollers 5 and 16 in the direction of the arrow 26 to the succeeding processing device. Thus, the output appearing between rollers 5 and 16 is a succession of items 23 which either has a uniform overlapping or a uniform spacing between succeeding items.

It should be understood that when items are introduced into the feed conveyor section individually, the device acts nearly as a pure reversing unit.

Figure 2:
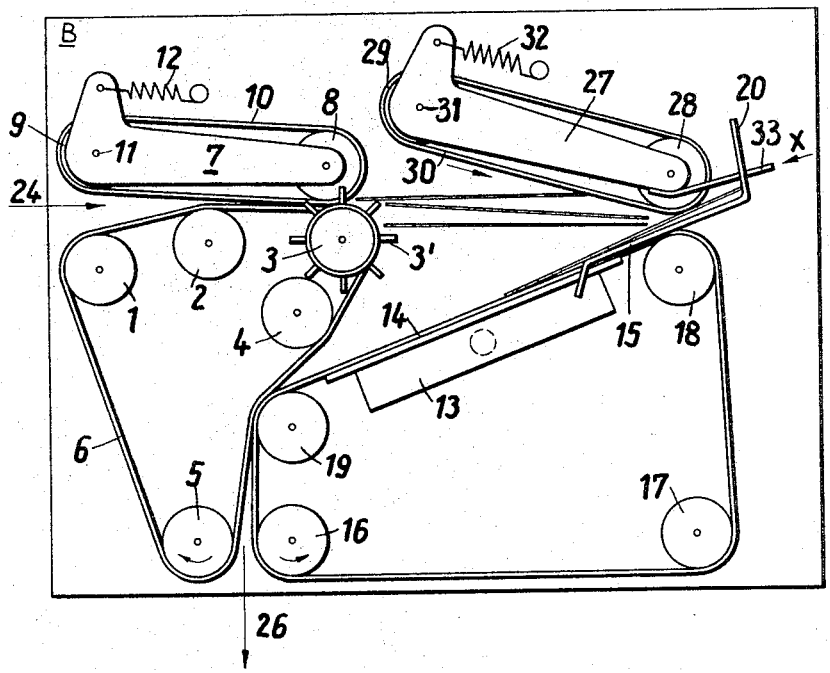
FIGURE 2 is a plan view of another embodiment of the present invention.

Turning now to the embodiment of FIGURE 2, there is shown a device which is substantially identical with that of FIGURE 1 with the exception that the resilient member 25 is removed and an additional conveyor belt 30 is provided and is arranged to advance in the direction of the arrow. The conveyor belt 30 is guided and supported by rollers 28 and 29, with the roller 29 being pivotably mounted on a pivot 31 which is attached to the support B for the device and with the roller 28 being pivotably mounted on the end of the long arm of a rocker 27 which is also pivotably mounted at 31. The rocker 27 is biassed by a tension spring 32 which is connected to the free end of the short arm of the rocker for urging the roller 28 toward the approach wall 15 of the accelerating section. The free end of the long arm of rocker 27 also carries a stop bar 33 which is disposed in a notch in wall 20 in a manner analogous to that of the free end of member 25 in FIGURE 1. The movement of belt 30 serves to ensure that each item 23 in the buffer storage area will remain in position in abutment against wall 20 until it comes under the influence of the suction produced in trough 13 and communicating by openings in belt 14.

Figure 3:
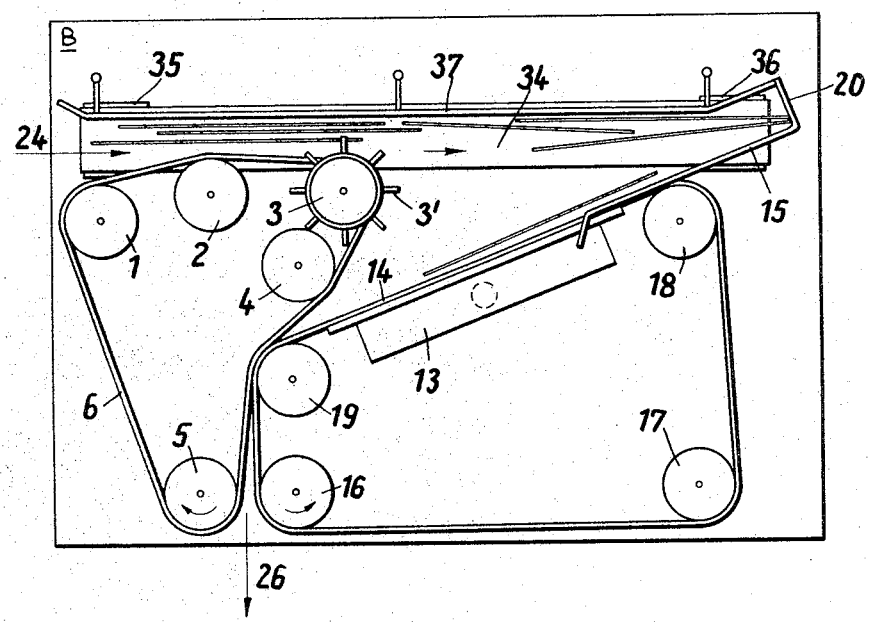
FIGURE 3 is a plan view of yet another embodiment of the present invention.

Referring now specifically to FIGURE 3, there is shown another embodiment of the present invention which differs from that shown in FIGURE 1 in that, in place of the conveyor belt 6 there is provided a horizontal conveyor belt 34 which is mounted on and guided by rollers 35 and 36 and which extends from the input end of the feed conveyor section to the region of the intercepting wall 20. There is also provided a vertical guide fence 37 which serves to maintain the items 23 in an upright position. It may be appreciated that belt 34 helps to maintain each item against intercepting wall 20 until that item comes under the influence of the suction of belt 14.

Referring now specifically to FIGURE 4, there is shown another embodiment of the present invention which is arranged to permit items to be selectively delivered through either one of two outlets, these outlets being indicated by the arrows 26 and 38, respectively. The arrangement of FIGURE 4 is such that when the items are to be delivered between rollers 5 and 16 they are handled in the same manner as for the previously-described embodiments, while when the items are to be delivered in the direction of arrow 38 they do not undergo a reversal of direction. However, the flow density of these items will be rendered uniform by the device for passage through either outlet.

Structurally, the embodiment of FIGURE 4 differs from the previously-illustrated embodiments in that a second outlet channel is provided substantially in line with the direction of travel of items through the feed conveyor section, this outlet channel being formed by a conveyor belt 41 mounted on rollers 39 and 40 and a conveyor belt 44 mounted on rollers 42 and 43 and disposed opposite conveyor belt 41. The portions of conveyor belts 41 and 44 which are adjacent to one another advance in the same direction with the belt 44 running at a higher speed than the belt 41.

Belt 41 extends along substantially the entire length of the device and forms a part of the input conveyor section. As is best seen in FIGURE 7, the conveyor belt 41 is advantageously made of two strips which are laterally displaced from one another so as to leave a space in which the belt 44 is disposed. In this embodiment the suction conveyor belt 14 is preferably perforated uniformly along its entire length so as to cause the items to have a predetermined amount of overlapping when they leave the device in the direction of arrow 26.

In order to permit a selection of the direction in which items 23 will leave the device, there is provided a lever which is pivotably mounted at 47 and which has an intercepting wall portion 45, which replaces wall 20, and a guide member 46, which replaces the approach wall 15 of the previous embodiments. This lever is pivotable between a first position, which is shown in FIGURE 4 in solid lines, and a second position, which is shown in dotted lines with the portion 45 labelled 45' and the portion 46 labelled 46'. When the lever is in its first position, portion 45 acts as an intercepting wall and portion 46 acts as an approach wall and items are fed, with uniform overlapping, along suction conveyor belt 14 and through the opening between rollers 5 and 16 substantially in the manner described in connection with the previously-illustrated embodiments. When the lever is rotated into its second position, as indicated by numerals 45' and 46', the items are prevented from moving against belt 14 and are permitted to pass into the region between belts 41 and 44 and exit from the device in the direction of arrow 38.

The pivoting of the lever constituting elements 45 and 46 may be effected manually or automatically with the aid of an electromagnet (not shown), for example.

In addition, there is provided a guide wall 48 behind which the intercepting member 45' moves when the lever is in its second position, the guide wall 48 serving to facilitate the entry of items into the outlet channel formed by belts 41 and 44.

When the lever is in its second position, all of the items are guided by guide wall 48 into the region between belts 41 and 44. Due to the speed differential between belts 41 and 44, a relative displacement takes place between bunched items disposed therebetween in such a manner that the items leave the region between rollers 40 and 43 with a relatively uniform flow density and with a uniform direction of overlapping.

Among the many applications which may be found for the embodiment of FIGURE 4, may be cited its use in a sorting channel system of a coding station for an automatic letter sorting installation. In this case the exit indicated by arrow 26 may lead to a suitable sorting machine, while the exit indicated by arrow 38 may lead to a simple stacking container.

One particular advantage of the embodiment of FIGURE 4 is that it permits items to be fed out in either one of two directions without requiring any increase in the space occupied by the device.

It should be noted that, at least in the embodiments of FIGURES 1, 2 and 4, the items are moved within the device at a relatively high speed and are thus subjected to correspondingly high inertia forces. Also, the items in these embodiments can easily be subjected to a relatively high suction action when coming within the region of action of the belt 14. Therefore, although these embodiments have been illustrated and described as having their movable components mounted on a horizontal surface, the effectiveness with which they operate will be relatively unaffected by changes in their spatial orientation, i.e., by placing surface B in other than a horizontal plane.

It will be understood that the above description of the present invention is susceptible to various modifications, changes, and adaptations, and the same are intended to be comprehended within the meaning and range of equivalents of the appended claims.

What is claimed is:

1. A method for converting a random flow of flat items into a flow having a uniform density and a regular arrangement, comprising the steps of:
    (a) conveying the random flow in a first direction;
    (b) halting the items at an intercepting plane and temporarily storing them adjacent such plane whenever the rate of random flow in said first direction exceeds a desired flow rate;
    (c) bringing that end of each successive item which was trailing during said conveying step within the region of influence of a suction conveyor zone; and
    (d) moving the items at the desired flow rate and at a uniform flow density in succession along the suction conveyor zone in a second direction which forms an angle of between approximately 120° and 180° with said first direction.

2. A method as defined in claim 1, wherein said step of moving the items is carried out by spacing such items a uniform, predetermined distance apart.

3. A method as defined in claim 1, wherein said step of moving the items is carried out by causing the items to overlap one another in a uniform manner.

4. A method as defined in claim 1, wherein the items are maintained in a vertical position during their travel, and comprising the further step of supporting the lower edge of each item during said conveying and halting steps.

5. A method as defined in claim 1, wherein said step of conveying is carried out by applying a positive feeding action to each item up to a point whose distance from such intercepting plane is greater than the length of the longest item to be handled.

6. A method as defined in claim 1, wherein said step of conveying is carried out by imparting to each item a stiffening curvature in a direction perpendicular to its direction of travel.

7. A method as defined in claim 6, wherein such curvature is convex in a direction toward such suction conveyor zone.

8. A method as defined in claim 1, wherein said step of halting the items includes resiliently urging them toward such suction conveyor zone.

9. A method as defined in claim 1, comprising the further step of selectively moving the intercepting plane out of the path of travel of the items for permitting selected items to by-pass such suction conveyor zone and to be carried off in said first direction.

10. A method as defined in claim 9, wherein said step of moving the intercepting plane includes guiding such selected items into an outlet conveyor channel.

References Cited

UNITED STATES PATENTS

| 2,889,941 | 6/1959 | Mehlis | 214—11 |
| 3,166,312 | 12/1965 | Rehm | 271—74 |
| 3,219,339 | 11/1965 | Gutierrez | 271—74 X |

FOREIGN PATENTS

| 733,833 | 5/1966 | Canada. |
| 1,384,175 | 11/1964 | France. |

EVON C. BLUNK, *Primary Examiner.*

RICHARD E. AEGERTER, *Examiner.*